US011970751B2

(12) United States Patent
Ushigami et al.

(10) Patent No.: US 11,970,751 B2
(45) Date of Patent: Apr. 30, 2024

(54) GRAIN-ORIENTED ELECTRICAL STEEL SHEET AND METHOD FOR MANUFACTURING THE SAME

(71) Applicant: NIPPON STEEL CORPORATION, Tokyo (JP)

(72) Inventors: Yoshiyuki Ushigami, Tokyo (JP); Shinji Yamamoto, Tokyo (JP); Hideyuki Hamamura, Tokyo (JP); Takashi Kataoka, Tokyo (JP); Shunsuke Okumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 482 days.

(21) Appl. No.: 17/421,779

(22) PCT Filed: Jan. 16, 2020

(86) PCT No.: PCT/JP2020/001141

§ 371 (c)(1),
(2) Date: Jul. 9, 2021

(87) PCT Pub. No.: WO2020/149322

PCT Pub. Date: Jul. 23, 2020

(65) Prior Publication Data

US 2022/0090227 A1 Mar. 24, 2022

(30) Foreign Application Priority Data

Jan. 16, 2019 (JP) ................................ 2019-005057

(51) Int. Cl.
*C21D 9/46* (2006.01)
*C21D 3/04* (2006.01)
(Continued)

(52) U.S. Cl.
CPC ................ *C21D 9/46* (2013.01); *C21D 3/04* (2013.01); *C21D 6/005* (2013.01); *C21D 6/008* (2013.01);
(Continued)

(58) Field of Classification Search
CPC ...... C21D 1/76; C21D 10/00; C21D 2201/05; C21D 2221/00; C21D 3/04; C21D 6/005;
(Continued)

(56) References Cited

U.S. PATENT DOCUMENTS 3,932,236 A 1/1976 Wada et al.
2021/0287834 A1 9/2021 Yoshizaki et al.

FOREIGN PATENT DOCUMENTS

EP 0 565 029 A1 10/1993
JP 49-96920 A 9/1974
(Continued)

*Primary Examiner* — Lawrence D Ferguson
(74) *Attorney, Agent, or Firm* — Birch, Stewart, Kolasch & Birch, LLP

(57) ABSTRACT

The grain-oriented electrical steel sheet according to the present embodiment is a grain-oriented electrical steel sheet having a base steel sheet (1), an intermediate layer (4) disposed to be in contact with the base steel sheet (1), and an insulation coating (3) disposed to be in contact with the intermediate layer (4). The grain-oriented electrical steel sheet according to the present embodiment includes a surface of the base steel sheet (1) having a strain region (D) which extends in a direction intersecting a rolling direction of the base steel sheet (1), and a crystalline phosphorus oxide $M_2P_4O_{13}$ present in the insulation coating (3) on the strain region (D) in a cross-sectional view of a surface parallel to the rolling direction and a sheet thickness direction of the base steel sheet (1). (M means at least one or both of Fe and Cr.)

8 Claims, 3 Drawing Sheets

(51) Int. Cl.

| | |
|---|---|
| ***C21D 6/00*** | (2006.01) |
| ***C21D 8/00*** | (2006.01) |
| ***C21D 8/12*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***H01F 1/147*** | (2006.01) |

(52) U.S. Cl.
CPC ........... *C21D 8/005* (2013.01); *C21D 8/1222* (2013.01); *C21D 8/1233* (2013.01); *C21D 8/1283* (2013.01); *C21D 8/1294* (2013.01); *C22C 38/001* (2013.01); *C22C 38/02* (2013.01); *C22C 38/04* (2013.01); *C22C 38/06* (2013.01); *H01F 1/147* (2013.01); *C21D 2221/00* (2013.01)

(58) Field of Classification Search
CPC ...... C21D 6/008; C21D 8/005; C21D 8/1222; C21D 8/1233; C21D 8/1255; C21D 8/1272; C21D 8/1283; C21D 8/1294; C21D 9/46; C22C 38/00; C22C 38/001; C22C 38/02; C22C 38/04; C22C 38/06; C23C 22/08; C23C 22/74; C23C 22/00; H01F 1/147; H01F 1/18; B23K 26/355
See application file for complete search history.

(56) References Cited

FOREIGN PATENT DOCUMENTS

| | | | |
|---|---|---|---|
| JP | 5-279747 | A | 10/1993 |
| JP | 6-184762 | A | 7/1994 |
| JP | 9-78252 | A | 3/1997 |
| JP | 11-12755 | A | 1/1999 |
| JP | 2001-220683 | A | 8/2001 |
| JP | 2003-193251 | A | 7/2003 |
| JP | 2003-193252 | A | 7/2003 |
| JP | 2007-119821 | A | 5/2007 |
| JP | 2012-31519 | A | 2/2012 |
| WO | WO 2018/051902 | A1 | 3/2018 |

GRAIN-ORIENTED ELECTRICAL STEEL SHEET AND METHOD FOR MANUFACTURING THE SAME

TECHNICAL FIELD

The present invention relates to a grain-oriented electrical steel sheet having excellent coating adhesion. Particularly, the present invention relates to a grain-oriented electrical steel sheet having excellent coating adhesion of an insulation coating even without having a forsterite film.

Priority is claimed on Japanese Patent Application No. 2019-005057, filed Jan. 16, 2019, the content of which is incorporated herein by reference.

BACKGROUND ART

Grain-oriented electrical steel sheets are soft magnetic materials and are mainly used as iron core materials for transformers. Therefore, magnetic properties such as high magnetization characteristics and low iron loss are required. The magnetization characteristics are magnetic flux densities induced when the iron core is excited. When magnetic flux densities increase, sizes of iron cores can be reduced, which is advantageous in terms of device constitutions of transformers and also in terms of the manufacturing costs of transformers.

In order to improve the magnetic properties, it is necessary to control texture so that as many grains as possible in a crystal orientation (Goss orientation) in which {110} plane is aligned parallel to the steel sheet surface and <100> axis is aligned with the rolling direction are formed. In order to accumulate crystal orientations in the Goss orientation, it is usual practice to finely precipitate inhibitors such as AlN, MnS, and MnSe in the steel to control a secondary recrystallization.

The iron loss is a power loss consumed as heat energy when the iron core is excited by an alternating-current magnetic field. From the viewpoint of energy saving, the iron loss is required to be as low as possible. Magnetic susceptibility, sheet thickness, film tension, amount of impurities, electrical resistivity, grain size, magnetic domain size, and the like affect a level of the iron loss. Even now that various technologies for electrical steel sheets have been developed, research and development to reduce the iron loss is being continued to improve energy efficiency.

Other characteristics required for grain-oriented electrical steel sheets are characteristics of a coating formed on a surface of a base steel sheet. Generally, in grain-oriented electrical steel sheets, as shown in FIG. 1, a forsterite film 2 mainly composed of $Mg_2SiO_4$ (forsterite) is formed on the base steel sheet 1, and an insulation coating 3 is formed on the forsterite film 2. The forsterite film and the insulation coating have a function of electrically insulating the surface of the base steel sheet and applying tension to the base steel sheet to reduce the iron loss. The forsterite film also contains a small amount of the impurities and additives contained in the base steel sheet and an annealing separator, and reaction products thereof, in addition to $Mg_2SiO_4$.

In order for the insulation coating to exhibit insulation characteristics and required tension, the insulation coating should not peel from the electrical steel sheet. Therefore, the insulation coating is required to have high coating adhesion. However, it is not easy to increase both the tension applied to the base steel sheet and the coating adhesion at the same time. Even now, research and development to enhance both of them at the same time is continuing.

Grain-oriented electrical steel sheets are usually manufactured by the following procedure. A silicon steel slab containing 2.0 to 4.0 mass % of Si is hot-rolled, the steel sheet after the hot-rolling is annealed as necessary, and then the annealed steel sheet is cold-rolled once or twice or more with intermediate annealing interposed therebetween to finish the steel sheet with a final thickness. Then, the steel sheet having the final thickness is decarburization-annealed in a wet hydrogen atmosphere to promote primary recrystallization in addition to decarburization and to form an oxide layer on the surface of the steel sheet.

An annealing separator containing MgO (magnesia) as a main component is applied to the steel sheet having an oxide layer, dried, and after drying, the steel sheet is wound in a coil shape. Next, the coiled steel sheet is final-annealed to promote secondary recrystallization, and the crystal orientations of the grains are accumulated in the Goss orientation. Further, MgO in the annealing separator is reacted with $SiO_2$ (silica) in the oxide layer to form an inorganic forsterite film mainly composed of $Mg_2SiO_4$ on the surface of the base steel sheet.

Next, the steel sheet having the forsterite film is purification-annealed to diffuse the impurities in the base steel sheet to the outside and to remove them. Further, after the steel sheet is flattening-annealed, a solution mainly composed of, for example, a phosphate and colloidal silica is applied to the surface of the steel sheet having the forsterite film and is baked to form an insulation coating. At this time, tension due to a difference in a coefficient of thermal expansion is applied between the crystalline base steel sheet and the substantially amorphous insulation coating. Therefore, the insulation coating may be referred to as a tension coating.

An interface between the forsterite film mainly composed of $Mg_2SiO_4$ ("2" in FIG. 1) and the steel sheet ("1" in FIG. 1) usually has a non-uniform uneven shape (refer to FIG. 1). The uneven interface slightly diminishes the effect of reducing the iron loss due to tension. Since the iron loss is reduced when the interface is smoothed, the following developments have been carried out to date.

Patent Document 1 discloses a manufacturing method in which the forsterite film is removed by a method such as pickling and the surface of the steel sheet is smoothed by chemical polishing or electrolytic polishing. However, in the manufacturing method of Patent Document 1, it may be difficult for the insulation coating to adhere to the surface of the base steel sheet.

Therefore, in order to improve the coating adhesion of the insulation coating to the smoothed surface of the steel sheet, as shown in FIG. 2, it has been proposed to form an intermediate layer 4 (or a base film) between the base steel sheet and the insulation coating. A base film disclosed in Patent Document 2 and formed by applying an aqueous solution of a phosphate or alkali metal silicate is also effective in the coating adhesion. As a more effective method, Patent Document 3 discloses a method in which a steel sheet is annealed in a specific atmosphere before an insulation coating is formed and an externally oxidized silica layer is formed as an intermediate layer on the surface of the steel sheet.

The coating adhesion can be improved by forming such an intermediate layer, but since large-scale equipment such as electrolytic treatment equipment and dry coating equipment is additionally required, it may be difficult to secure a site therefor, and the manufacturing cost may increase.

Patent Documents 4 to 6 disclose techniques in which, when an insulation coating containing an acidic organic resin as a main component which does not substantially contain chromium is formed on a steel sheet, a phosphorus compound layer (a layer composed of $FePO_4$, $Fe_3(PO_4)_2$, $FeHPO_4$, $Fe(H_2PO_4)_2$, $Zn_2Fe(PO_4)_2$, $Zn_3(PO_4)_2$, and hydrates thereof, or a layer composed of a phosphate of Mg, Ca, and Al having a thickness of 10 to 200 nm) is formed between the steel sheet and the insulation coating to improve the exterior and adhesion of the insulation coating.

On the other hand, a magnetic domain control method (which subdivides a 180° magnetic domain) in which a width of a 180° magnetic domain is narrowed by forming stress strain parts and groove parts extending in a direction intersecting the rolling direction at predetermined intervals in the rolling direction is known as a method for reducing anomalous eddy current loss which is a type of iron loss. In a method of forming stress strain, a 180° magnetic domain refinement effect of a reflux magnetic domain generated in the strain part (a strain region) is used. A representative method is a method which utilizes shock waves or rapid heating by radiating a laser beam. In this method, the surface shape of the irradiated portion hardly changes. Further, a method of forming a groove utilizes an anti-magnetic field effect due to a magnetic pole generated on a side wall of the groove. That is, the magnetic domain control is classified as of a strain applying type and a groove forming type.

For example, Patent Document 7 discloses that an oxide on the surface of the final-annealed steel sheet is removed, the surface is smoothed, then a film is formed on the surface, and also the magnetic domain is subdivided by irradiation with a laser beam, an electron beam, or a plasma flame.

CITATION LIST

Patent Document

Patent Document 1

Japanese Unexamined Patent Application, First Publication No. S49-096920 [Patent Document 2]

Japanese Unexamined Patent Application, First Publication No. H05-279747 [Patent Document 3]

Japanese Unexamined Patent Application, First Publication No. H06-184762 [Patent Document 4]

Japanese Unexamined Patent Application, First Publication No. 2001-220683 [Patent Document 5]

Japanese Unexamined Patent Application, First Publication No. 2003-193251 [Patent Document 6]

Japanese Unexamined Patent Application, First Publication No. 2003-193252 [Patent Document 7]

Japanese Unexamined Patent Application, First Publication No. H11-012755

SUMMARY OF THE INVENTION

Problems to be Solved by the Invention

In a grain-oriented electrical steel sheet having a three-layer structure of "base steel sheet-intermediate layer mainly composed of silicon oxide-insulation coating" as exemplified above and not having a forsterite film, there is a problem that the width of the magnetic domain is wider than that of a grain-oriented electrical steel sheet having the forsterite film as shown in FIG. 1. As a result of examining various magnetic domain controls for grain-oriented electrical steel sheets not having a forsterite film, the present inventors have focused on the fact that the magnetic domain is preferably subdivided when an energy density of the laser beam or electron beam radiated to the grain-oriented electrical steel sheet is increased.

However, according to the studies by the present inventors, it has been found that when the energy density of the laser beam or the electron beam is increased, the subdivision of the magnetic domain is promoted and at the same time, the insulation coating is affected. Specifically, a problem that, when a laser beam or an electron beam having a high energy density is radiated, a structure of the insulation coating is changed due to an influence of radiation heat, and the adhesion of the insulation coating is reduced has been found.

The present invention has been made in view of the above problems, and an object thereof is to provide a grain-oriented electrical steel sheet capable of ensuring good adhesion of an insulation coating and obtaining a good iron loss reduction effect in grain-oriented electrical steel sheets that do not have a forsterite film and have strain regions formed on the base steel sheet, and a method for manufacturing such a grain-oriented electrical steel sheet.

Means for Solving the Problem (1) A grain-oriented electrical steel sheet according to one aspect of the present invention is a grain-oriented electrical steel sheet having a base steel sheet, an intermediate layer disposed to be in contact with the base steel sheet, and an insulation coating disposed to be in contact with the intermediate layer. The grain-oriented electrical steel sheet includes a surface of the base steel sheet having a strain region which extends in a direction intersecting a rolling direction of the base steel sheet, and crystalline phosphorus oxide $M_2P_4O_{13}$ present in the insulation coating on the strain region in a cross-sectional view of a surface parallel to the rolling direction and a sheet thickness direction of the base steel sheet.

(M means at least one or both of Fe and Cr)

(2) In the grain-oriented electrical steel sheet described in (1), in the cross-sectional view of the strain region, when an entire length of an observation field of view in a direction orthogonal to the sheet thickness direction of the base steel sheet is defined as $L_z$, and a total of void lengths Ld in the direction orthogonal to the sheet thickness direction of the base metal sheet is ΣLd, and a line segment ratio X of a void region in which voids are present is defined by the following Equation 1, the line segment ratio X may be 20% or less.

$$X=(\Sigma L_d/L_z)\times 100 \quad \text{(Equation 1)}$$

(3) In the grain-oriented electrical steel sheet described in (1) or (2), in the cross-sectional view of the surface parallel to the rolling direction and the sheet thickness direction of the base steel sheet, when a region including a center of the strain region in the rolling direction of the base steel sheet and having a width of 10 μm in the rolling direction of the base steel sheet is defined as a central portion of the strain region, the crystalline phosphorus oxide $M_2P_4O_{13}$ may be present in the insulation coating of the central portion.

(4) In the grain-oriented electrical steel sheet described in (3), in the cross-sectional view of the strain region, a proportion of a crystalline phosphorus oxide region in the insulation coating of the central portion may be 10% or more and 60% or less in terms of an area ratio.

(5) In the grain-oriented electrical steel sheet described in (3) or (4), in the cross-sectional view of the strain region, an average thickness of the intermediate layer of the central portion may be 0.5 times or more and twice or less an average thickness of the intermediate layer other than the strain region.

(6) In the grain-oriented electrical steel sheet described in any one of (3) to (5), in the cross-sectional view of the strain region, an area ratio of an amorphous phosphorus oxide region in the insulation coating of the central portion may be 1% or more and 60% or less.

(7) A method for manufacturing a grain-oriented electrical steel sheet according to one aspect of the present invention is a method for manufacturing the grain-oriented electrical steel sheet described in any one of (1) to (6). The method includes a strain region forming process of irradiating the grain-oriented electrical steel sheet having the base steel sheet, the intermediate layer disposed to be in contact with the base steel sheet, and the insulation coating disposed to be in contact with the intermediate layer with a laser beam or an electron beam and forming a strain region which extends in the direction intersecting the rolling direction on the surface of the base steel sheet, wherein, in the strain region forming process, a temperature of the central portion of the strain region in the rolling direction and an extension direction of the strain region is heated to 900° C. or higher and 1500° C. or lower.

(8) In the method described in (7), in the strain region forming process, the strain region may be formed by irradiating the grain-oriented electrical steel sheet with a laser beam, and radiation conditions of the laser beam may be, laser radiation energy density per unit area: 0.8-6.5 $mJ/mm^2$ beam radiation width: 10-500 μm radiation interval: 1 to 20 mm radiation time (sheet passing rate, laser scanning rate): 5 to 200 μs.

Effects of the Invention

According to the present invention, it is possible to provide a grain-oriented electrical steel sheet capable of ensuring good adhesion of an insulation coating and obtaining a good iron loss reduction effect in grain-oriented electrical steel sheets that do not have a forsterite film and have strain regions formed on the base steel sheet, and a method for manufacturing such a grain-oriented electrical steel sheet.

EMBODIMENTS FOR IMPLEMENTING THE INVENTION

Figure 1:
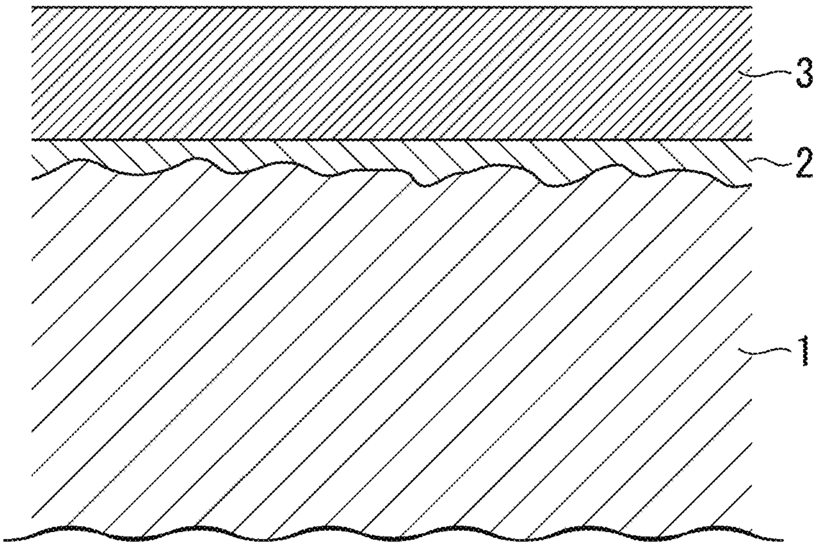
FIG. 1 is a schematic cross-sectional view showing a coating structure of a conventional grain-oriented electrical steel sheet.
Figure 2:
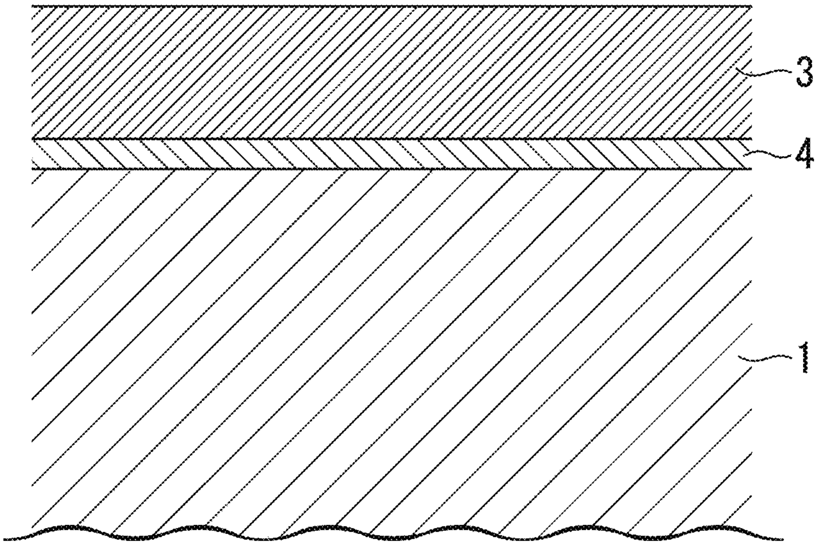
FIG. 2 is a schematic cross-sectional view showing another coating structure of the conventional grain-oriented electrical steel sheet.

The present inventors have found that a width of a magnetic domain can be narrowed and adhesion of an insulation coating can be ensured under specific radiation conditions, as a result of diligent studies on grain-oriented electrical steel sheets which do not have a forsterite film by changing the radiation conditions of a laser beam or electron beam.

Further, the present inventors have also found that, when the above specific radiation conditions are not satisfied, even though the width of the magnetic domain can be narrowly controlled, voids are generated in the insulation coating and the adhesion of the insulation coating deteriorates.

Further, the present inventors have found that no change is observed in the insulation coating after irradiation under the conventional radiation conditions, but when a strain region is formed under the specific radiation conditions as described above, a unique structure containing crystalline phosphorus oxide $M_2P_4O_{13}$ can be seen in a central portion of the strain region and the vicinity thereof.

Hereinafter, preferred embodiments of the present invention will be described. However, it is obvious that the present invention is not limited to configurations disclosed in the embodiments, and various modifications can be made without departing from the purpose of the present invention. It is also obvious that elements of the following embodiments can be combined with each other within the scope of the present invention.

Further, in the following embodiments, a numerical limitation range represented by using "to" means a range including numerical values before and after "to" as a lower limit value and an upper limit value. Numerical values indicated by "greater than" or "less than" are not included in the numerical range thereof.

[Grain-Oriented Electrical Steel Sheet]

A grain-oriented electrical steel sheet according to the present embodiment has a base steel sheet, an intermediate layer disposed to be in contact with the base steel sheet, and an insulation coating disposed to be in contact with the intermediate layer.

The grain-oriented electrical steel sheet according to the present embodiment has a strain region which extends in a direction intersecting a rolling direction on a surface of the base steel sheet, and crystalline phosphorus oxide $M_2P_4O_{13}$ is present in the insulation coating on the strain region in a cross-sectional view of a surface parallel to the rolling direction and a sheet thickness direction. M means at least one or both of Fe and Cr.

In the grain-oriented electrical steel sheet according to the present embodiment, there are a base steel sheet, an intermediate layer disposed to be in contact with the base steel sheet, and an insulation coating disposed to be in contact with the intermediate layer, and there is no forsterite film.

Here, the grain-oriented electrical steel sheet without a forsterite film is a grain-oriented electrical steel sheet manufactured by removing the forsterite film after production, or a grain-oriented electrical steel sheet manufactured by curbing formation of a forsterite film.

In the present embodiment, the rolling direction of the base steel sheet is a rolling direction in hot rolling or cold rolling when the base steel sheet is manufactured by a manufacturing method which will be described later. The rolling direction may also be referred to as a sheet passing direction, a conveying direction, or the like of a steel sheet. The rolling direction is a longitudinal direction of the base steel sheet. The rolling direction can also be identified using a device for observing a magnetic domain structure or a device for measuring a crystal orientation such as an X-ray Laue method.

In the present embodiment, the direction intersecting the rolling direction means a direction in a range of inclination within 45° in a clockwise or counterclockwise direction parallel to the surface of the base steel sheet from a direction parallel to or perpendicular to the surface of the base steel sheet with respect to the rolling direction (hereinafter, it is also simply referred to as a "direction perpendicular to the rolling direction"). Since the strain region is formed on the surface of the base steel sheet, the strain region extends from a direction perpendicular to the rolling direction and the sheet thickness direction on the surface of the base steel sheet to a direction of inclination within 45° on the plate surface of the base steel sheet.

The surface parallel to the rolling direction and the sheet thickness direction means a surface parallel to both the above-described rolling direction and sheet thickness direction of the base steel sheet.

The insulation coating on the strain region means a portion of the insulation coating disposed on the base steel sheet which is located above the strain region in the sheet thickness direction in a cross-sectional view of a surface parallel to the rolling direction and the sheet thickness direction.

Hereinafter, each of constituent components of the grain-oriented electrical steel sheet according to the present embodiment will be described.

(Base Steel Sheet)

The base steel sheet which is a base material has a texture in which a crystal orientation is controlled such that it becomes a Goss orientation on the surface of the base steel sheet. A surface roughness of the base steel sheet is not particularly limited, but an arithmetic mean roughness (Ra) thereof is preferably 0.5 μm or less, and more preferably 0.3 μm or less to apply a large tension to the base steel sheet to reduce iron loss. A lower limit of the arithmetic mean roughness (Ra) of the base steel sheet is not particularly limited, but when it is 0.1 μm or less, an iron loss improving effect becomes saturated, and thus the lower limit may be 0.1 μm.

A sheet thickness of the base steel sheet is also not particularly limited, but an average sheet thickness thereof is preferably 0.35 mm or less, and more preferably 0.30 mm or less to further reduce the iron loss. A lower limit of the sheet thickness of the base steel sheet is not particularly limited, but may be 0.10 mm from the viewpoint of manufacturing equipment and cost. A method for measuring the sheet thickness of the base steel sheet is not particularly limited, but it can be measured using, for example, a micrometer or the like.

A chemical composition of the base steel sheet is not particularly limited, but preferably, it includes, for example, a high concentration of Si (for example, 0.8 to 7.0 mass %). In this case, a strong chemical affinity develops between the base steel sheet and the intermediate layer mainly composed of a silicon oxide, and the intermediate layer and the base steel sheet are firmly adhered to each other.

(Intermediate Layer)

The intermediate layer is disposed to be in contact with the base steel sheet (that is, formed on the surface of the base steel sheet), and has a function of bringing the base steel sheet and the insulation coating into close contact with each other. The intermediate layer extends continuously on the surface of the base steel sheet. The adhesion between the base steel sheet and the insulation coating is improved and stress is applied to the base steel sheet by forming the intermediate layer between the base steel sheet and the insulation coating.

The intermediate layer can be formed by heat-treating a base steel sheet in which the formation of the forsterite film is suppressed during final annealing, or a base steel sheet from which the forsterite film is removed after the final annealing in an atmospheric gas adjusted to a predetermined oxidation degree.

The silicon oxide which is a main component of the intermediate layer is preferably $SiO_x$ (x=1.0 to 2.0). When the silicon oxide is $SiO_x$ (x=1.5 to 2.0), the silicon oxide is more stable, which is more preferable.

For example, when a heat treatment is performed under conditions of an atmospheric gas: 20 to 80% $N_2$+80 to 20% $H_2$ (100% in total), a dew point: −20 to 2° C., an annealing temperature: 600 to 1150° C., and an annealing time: 10 to 600 seconds, an intermediate layer mainly composed of a silicon oxide can be formed.

When a thickness of the intermediate layer is thin, a thermal stress relaxation effect may not be sufficiently exhibited. Therefore, the thickness of the intermediate layer is preferably 2 nm or more on average. The thickness of the intermediate layer is more preferably 5 nm or more. On the other hand, when the thickness of the intermediate layer is thick, the thickness becomes non-uniform, and defects such as voids and cracks may occur in a layer. Therefore, the thickness of the intermediate layer is preferably 400 nm or less on average, and more preferably 300 nm or less. A method for measuring the thickness of the intermediate layer will be described later.

The intermediate layer may be an external oxide film formed by external oxidation. The external oxide film is an oxide film formed in an atmospheric gas having a low oxidation degree and means an oxide formed in a film shape on the surface of the steel sheet after an alloying element (Si) in the steel sheet is diffused to the surface of the steel sheet.

As described above, the intermediate layer contains silica (a silicon oxide) as a main component. In addition to the silicon oxide, the intermediate layer may contain an oxide of an alloying element contained in the base steel sheet. That is, it may contain any oxide of Fe, Mn, Cr, Cu, Sn, Sb, Ni, V, Nb, Mo, Ti, Bi, and Al, or a composite oxide thereof. The intermediate layer may also contain metal grains of Fe or the like. Further, the intermediate layer may contain impurities as long as the effect is not impaired.

In the grain-oriented electrical steel sheet according to the present embodiment, more preferably, an average thickness of the intermediate layer in a central portion thereof is 0.5 times or more and 2 times or less an average thickness of the intermediate layer other than the strain region in the cross-sectional view of the surface parallel to the rolling direction and the sheet thickness direction. Here, the central portion is a central portion of the strain region which will be described later.

With such a configuration, good adhesion of the insulation coating can be maintained even in the strain region.

Usually, since the laser beam or the electron beam is radiated at predetermined intervals along the rolling direction in a direction intersecting the rolling direction, a plurality of strain regions are intermittently formed in the rolling direction. Thus, a region between the Nth strain region counted in the rolling direction and, for example, the N+1th strain region (or the N−1th strain region) adjacent to the Nth strain region in the rolling direction can be referred to as a region other than the strain region.

An average thickness of the intermediate layer other than the strain region can be measured with a scanning electron microscope (SEM) or a transmission electron microscope (TEM) by a method which will be described later. Further, an average thickness of the intermediate layer in the strain region can also be measured by the same method.

Specifically, the average thickness of the intermediate layer in the strain region and the average thickness of the intermediate layer other than the strain region can be measured by the method described below.

First, a test piece is cut out so that a cutting direction is parallel to the sheet thickness direction (specifically, the test piece is cut out so that a cut surface is parallel to the sheet thickness direction and perpendicular to the rolling direction), and a cross-sectional structure of the cut surface is observed by the SEM at a magnification at which each of layers (that is, the base steel sheet, the intermediate layer, and the insulation coating) is included in an observation field of view. It is possible to infer how many layers the cross-sectional structure includes by observing with a backscattered electron composition image (a COMPO image).

In order to identify each of layers in the cross-sectional structure, a line analysis in the sheet thickness direction is performed using an energy dispersive X-ray spectroscopy (SEM-EDS), and a quantitative analysis of the chemical composition of each of layers is performed.

Elements to be quantitatively analyzed are five elements of Fe, Cr, P, Si, and O. “Atomic %” described below is not an absolute value of atomic %, but a relative value calculated based on an X-ray intensity corresponding to the five elements.

In the following, it is assumed that the relative value measured by the SEM-EDS is a specific numerical value obtained by performing a line analysis with a scanning electron microscope (NB5000) manufactured by Hitachi High-Technologies Corporation and an EDS analyzer (XFlash (r) 6130) manufactured by Bruker AXS GmbH, and inputting the results thereof to EDS data software (ESPRIT 1.9) manufactured by Bruker AXS GmbH, for calculation.

Further, the relative value measured by TEM-EDS shall be a specific numerical value obtained by performing a line analysis with a transmission electron microscope (JEM-2100F) manufactured by JEOL Ltd. and an energy dispersive X-ray analyzer (JED-2300T) manufactured by JEOL Ltd. and inputting the results thereof to the EDS data software (an analysis station) manufactured by JEOL Ltd. for calculation. Of course, the measurement with SEM-EDS and TEM-EDS is not limited to examples shown below.

First, the base steel sheet, the intermediate layer, and the insulation coating are identified as follows based on the observation results of the COMPO image and the quantitative analysis results of the SEM-EDS. That is, when there is a region in which a Fe content is 80 atomic % or more and an O content is less than 30 atomic % excluding the measurement noise, and also a line segment (a thickness) on a scanning line of the line analysis corresponding to this region is 300 nm or more, this region is determined as the base steel sheet, and the regions excluding the base steel sheet are determined as the intermediate layer and the insulation coating.

As a result of observing the region excluding the base steel sheet identified above, when there is a region in which a P content is 5 atomic % or more and the O content is 30 atomic % or more excluding the measurement noise, and also the line segment (the thickness) on the scanning line of the line analysis corresponding to this region is 300 nm or more, this region is determined as the insulation coating.

When the above-described region which is the insulation coating is identified, precipitates or inclusions contained in the film are not included in targets for determination, and a region which satisfies the above-described quantitative analysis results as a matrix phase is determined as the insulation coating. For example, when it is confirmed from the COMPO image or the line analysis results that the precipitates or inclusions are present on the scanning line of the line analysis, determination is made based on the quantitative analysis results as the matrix phase without this region being included in the targets. The precipitates or inclusions can be distinguished from the matrix phase by a contrast in the COMPO image, and can be distinguished from the matrix phase by an amount of constituent elements present in the quantitative analysis results.

When there is the region excluding the base steel sheet and the insulation coating identified above, and the line segment (the thickness) on the scanning line of the line analysis corresponding to this region is 300 nm or more, this region is determined as the intermediate layer. The intermediate layer may satisfy an average Si content of 20 atomic % or more and an average O content of 30 atomic % or more as an overall average (for example, the arithmetic mean of the atomic % of each of the elements measured at each of measurement points on the scanning line). The quantitative analysis results of the intermediate layer are quantitative analysis results as the matrix phase, which do not include analysis results of the precipitates or inclusions contained in the intermediate layer.

Further, in the region determined as the insulation coating above, a region in which a total amounts of Fe, Cr, P and O is 70 atomic % or more and the Si content is less than 10 atomic % excluding the measurement noise is determined as the precipitate.

As will be described later, a crystal structure of the above-described precipitate can be identified from a pattern of electron beam diffraction.

Although a crystalline phosphorus oxide $M_2P_2O_7$ may be present in the conventional insulation coating, the crystal structure of $M_2P_2O_7$ (M is at least one or both of Fe and Cr) can be identified and discriminated from the pattern of the electron beam diffraction.

The identification of each of the layers and the measurement of the thickness by the above-described COMPO image observation and SEM-EDS quantitative analysis are performed at five or more locations with different observation fields of view. An arithmetic mean value is obtained from values excluding a maximum value and a minimum value among the thicknesses of the layers obtained at five or more locations in total, and this average value is used as the thickness of each of the layers. However, the thickness of the oxide film which is the intermediate layer is measured at a location at which it can be determined that it is an external oxidation region and not an internal oxidation region by the observation of its morphology, and an average value thereof is obtained. The thickness (the average thickness) of the insulation coating and the intermediate layer can be measured by such a method.

When there is a layer in which the line segment (the thickness) on the scanning line of the line analysis is less than 300 nm in at least one of the above-described five or more observation fields of view, preferably, a corresponding layer is observed in detail with the TEM, and the identification of the corresponding layer and the measurement of the thickness are performed by the TEM.

More specifically, a test piece including a layer to be observed in detail using the TEM is cut out by focused ion beam (FIB) processing so that a cutting direction is parallel to the sheet thickness direction (specifically, the test piece is cut out so that a cut surface is parallel to the sheet thickness direction and perpendicular to the rolling direction), and the cross-sectional structure of this cut surface (a bright field image) is observed by scanning-TEM (STEM) at a magnification at which the corresponding layer is included in the observation field of view. When each of the layers is not included in the observation field of view, the cross-sectional structure is observed in a plurality of continuous fields of view.

In order to identify each of the layers in the cross-sectional structure, the line analysis is performed in the sheet thickness direction using the TEM-EDS, and the quantitative analysis of the chemical composition of each of the layers is performed. The elements to be quantitatively analyzed are five elements, Fe, Cr, P, Si, and O.

Each of the layers is identified and the thickness of each of the layers is measured based on the bright field image observation results by the TEM and the quantitative analysis results of the TEM-EDS described above. The method for identifying each of the layers and the method for measuring the thickness of each of the layers using the TEM may be performed according to the above-described method using the SEM.

When the thickness of each of the layers identified by the TEM is 5 nm or less, it is preferable to use a TEM having a spherical aberration correction function from the viewpoint of a spatial resolution. Further, when the thickness of each of the layers is 5 nm or less, a point analysis may be performed in the sheet thickness direction at intervals of, for example, 2 nm or less, the line segment (the thickness) of each of the layers may be measured, and this line segment may be adopted as the thickness of each of the layers. For example, when the TEM having the spherical aberration correction function is used, an EDS analysis can be performed with the spatial resolution of about 0.2 nm.

In the above-described method for identifying each of the layers, since the base steel sheet in the entire region is identified at first, then the insulation coating in a remainder is identified, and finally the remainder is determined as the intermediate layer, and also the precipitate is identified, in the case of a grain-oriented electrical steel sheet which satisfies the configuration of the present embodiment, there is no unidentified region other than each of the above-described layers in the entire region.

(Insulation Coating)

The insulation coating is a vitreous insulation coating formed by applying a solution mainly composed of a phosphate and colloidal silica ($SiO_2$) to the surface of the intermediate layer and baking it. This insulation coating can provide high surface tension to the base steel sheet. The insulation coating constitutes, for example, the outermost surface of the grain-oriented electrical steel sheet.

The average thickness of the insulation coating is preferably 0.1 to 10 μm. When the average thickness of the insulation coating is less than 0.1 μm, the coating adhesion of the insulation coating may not be improved, and it may be difficult to apply the required surface tension to the steel sheet. Therefore, the average thickness is preferably 0.1 μm or more, and more preferably 0.5 μm or more on average.

When the average thickness of the insulation coating is more than 10 μm, cracks may occur in the insulation coating at the stage of forming the insulation coating. Therefore, the average thickness is preferably 10 μm or less, and more preferably 5 μm or less on average.

In consideration of recent environmental problems, an average Cr concentration in the insulation coating is preferably limited to less than 0.10 atomic %, and more preferably limited to less than 0.05 atomic % as the chemical composition.

(Strain Region)

The strain region formed on the base steel sheet will be described with reference to FIGS. 3 and 4.

Figure 3:
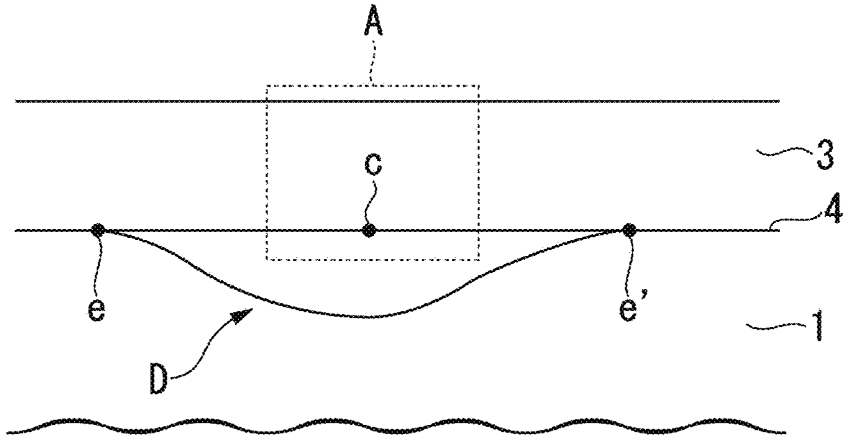
FIG. 3 is a schematic cross-sectional view for explaining a strain region of a grain-oriented electrical steel sheet according to an embodiment of the present invention.

FIG. 3 is a schematic view showing a cross section of a surface parallel to the rolling direction and the sheet thickness direction, and is a view including a strain region D formed on a surface of the base steel sheet 1. As shown in FIG. 3, an intermediate layer 4 is disposed to be in contact with the base steel sheet 1, an insulation coating 3 is disposed to be in contact with the intermediate layer 4, and the strain region D is formed on the surface of the base steel sheet 1. Since the intermediate layer 4 has a smaller thickness than those of the other layers, the intermediate layer 4 is represented by a line in FIG. 3.

Here, a center of the strain region means a center between end portions of the strain region in the rolling direction when a surface parallel to the rolling direction and the sheet thickness direction is seen in cross section, and for example, when a distance between the end portions of the strain regions in the rolling direction is 40 μm, the center of the strain regions is located at a distance of 20 μm from each of the end portions. In the cross-sectional view of FIG. 3, a center c of the strain region is indicated by a point located at an equal distance from an end portion e and an end portion e' of the strain region D formed on the base steel sheet.

In the example shown in FIG. 3, the insulation coating on the strain region D formed on the base steel sheet is a region A of the insulation coating 3 interposed between the end portion e and the end portion e'.

The end portion e or the end portion e' of the strain region D formed on the base steel sheet shown in FIG. 3 can be determined, for example, by a confidential index (CI) value map of electron backscatter diffraction (EBSD). That is, since crystal lattices are strained in a region in which the strain is accumulated by the radiation of the laser beam or the electron beam, a CI value is different from that in a non-irradiation region. Therefore, for example, the CI value map of the EBSD in the region including both the irradiation region and the non-irradiation region is acquired, and the region in the map is divided into a region in which the CI value is equal to or higher than a critical value and a region in which the CI value is less than the critical value with an arithmetic mean value of the upper limit value and the lower limit value (excluding measurement noise) of the CI value in the map as the critical value. Then, one of the regions is defined as the strain region (the irradiation region), and the other region is defined as a region (the non-irradiation region) other than the strain region. Thus, the strain region can be identified.

Figure 4:
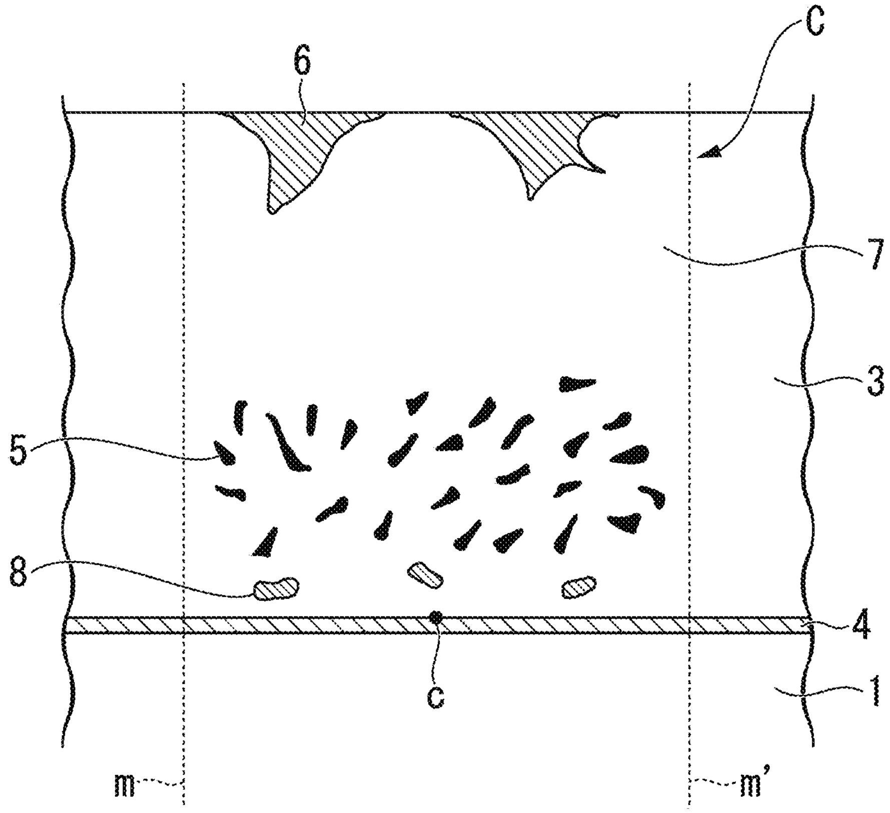
FIG. 4 is a schematic enlarged cross-sectional view of a portion A of FIG. 3.

FIG. 4 is a schematic view showing the cross section of the surface parallel to the rolling direction and the sheet thickness direction, and is an enlarged view of a range A surrounded by a broken line in FIG. 3. FIG. 4 shows a range including a central portion C of the strain region D.

The central portion of the strain region is a region including the center of the strain region and having a width of 10 μm in the rolling direction. In FIG. 4, the central portion C of the strain region D is shown surrounded by a straight line m and a straight line m'. The straight line m and the straight line m' are straight lines perpendicular to the rolling direction of the base steel sheet 1 and parallel to each other, and have an interval of 10 μm. In the example of FIG.

4, distances from the straight line m and the straight line m' to the center c of the strain region D are equal.

More preferably, positions of the center of the strain region and the center of the central portion of the strain region coincide with each other in the rolling direction.

A width of the strain region D which is the distance between the end portion e and the end portion e' is preferably 10 μm or more, and more preferably 20 μm or more. The width of the strain region D is preferably 500 μm or less, and more preferably 100 μm or less.

In the grain-oriented electrical steel sheet according to the present embodiment, it is more preferable that a crystalline phosphorus oxide $M_2P_4O_{13}$ is present in the insulation coating at the central portion of the strain region. M means at least one or both of Fe and Cr.

In the example shown in FIG. 4, a precipitate of the crystalline phosphorus oxide $M_2P_4O_{13}$ is present in the insulation coating 3 of the central portion C of the strain region D. In FIG. 4, it is referred to as a region 5 containing the precipitate (hereinafter, also referred to as a "crystalline phosphorus oxide region 5"). Further, a region 6 containing a precipitate of an amorphous phosphorus oxide (hereinafter, also referred to as an "amorphous phosphorus oxide region 6") is present around the crystalline phosphorus oxide region 5 of FIG. 4. In the insulation coating 3, regions other than the crystalline phosphorus oxide region 5 and the amorphous phosphorus oxide region 6 include a matrix phase 7 or voids 8 of the insulation coating.

The crystalline phosphorus oxide region 5 may be composed of only the precipitate of the crystalline phosphorus oxide $M_2P_4O_{13}$, or may be a region containing the precipitate of the crystalline phosphorus oxide $M_2P_4O_{13}$ and other precipitates. Further, the region 6 may be composed of only the precipitate of the amorphous phosphorus oxide, or may be a region containing the precipitate of the amorphous phosphorus oxide and other precipitates.

The crystalline phosphorus oxide $M_2P_4O_{13}$ in the crystalline phosphorus oxide region 5 is a phosphorus oxide, for example, $Fe_2P_4O_{13}$ or $Cr_2P_4O_{13}$, or $(Fe, Cr)_2P_4O_{13}$. The crystalline phosphorus oxide region 5 may be formed in the vicinity of the surface of the insulation coating 3. The region 6 may be formed in the vicinity of the intermediate layer 4 of the insulation coating 3.

The matrix phase 7 of the insulation coating contains P, Si, and O as a composition.

The precipitate of the crystalline phosphorus oxide $M_2P_4O_{13}$, the precipitate of the amorphous phosphorus oxide, and the like can be discriminated by a method for analyzing the pattern of the electron beam diffraction.

This identification may be performed using a powder diffraction file (PDF) of international center for diffraction data (ICDD). Specifically, when the precipitate is the crystalline phosphorus oxide $M_2P_4O_{13}$, a diffraction pattern of PDF: 01-084-1956 appears, and when the precipitate is $M_2P_2O_7$ in which the precipitate is present in the insulation coating not irradiated with the laser beam and the electron beam, a diffraction pattern of PDF: 00-048-0598 appears. When the precipitate is the amorphous phosphorus oxide, the diffraction pattern is a halo pattern.

In the grain-oriented electrical steel sheet according to the present embodiment, due to the presence of the crystalline phosphorus oxide $M_2P_4O_{13}$ in the insulation coating in the strain region, good adhesion of the insulation coating can be ensured even when the strain region is formed with an energy density at which a good iron loss reduction effect can be obtained.

Figure 5:
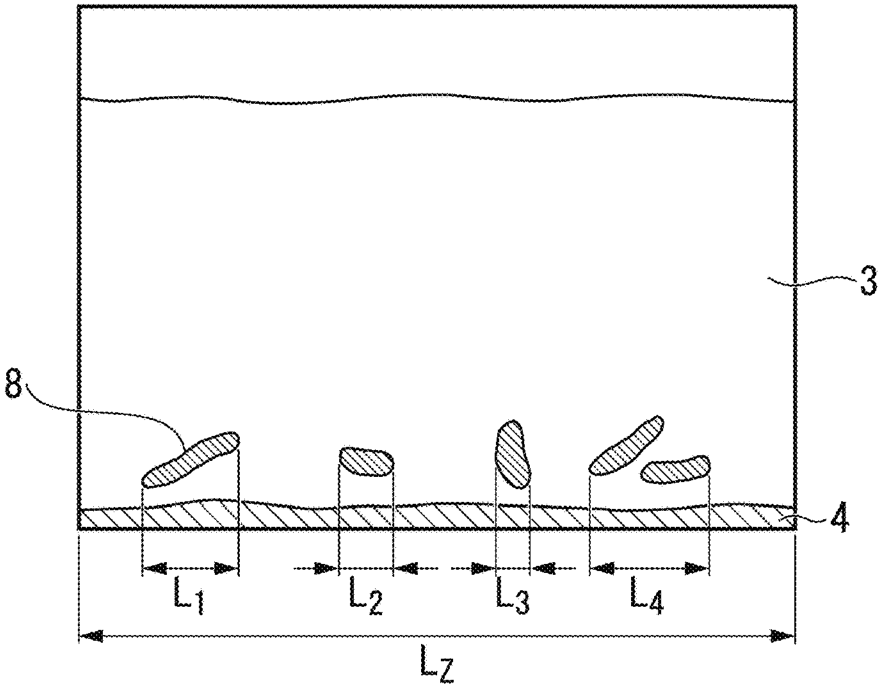
FIG. 5 is a diagram for explaining a definition of a line segment ratio of voids in the grain-oriented electrical steel sheet according to the embodiment.

In the grain-oriented electrical steel sheet according to the present embodiment, as shown in FIG. 5, in the cross-sectional view of the strain region in the surface parallel to the rolling direction and the sheet thickness direction, when an entire length of the observation field of view in a direction orthogonal to the sheet thickness direction is $L_z$, and a total of void lengths $L_d$ ($L_1$ to $L_4$ in the example of FIG. 5) in the direction orthogonal to the sheet thickness direction is $\Sigma L_d$, and a line segment ratio X of a void region in which the voids are present is defined by the following Equation 1, more preferably, the line segment ratio X is 20% or less.

$$X=(\Sigma L_d/L_z)\times 100 \qquad \text{(Equation 1)}$$

With such a configuration, peeling of the insulation coating starting from the void is suppressed, and an effect of improving the adhesion of the insulation coating can be obtained.

The void length $L_d$ can be identified by the following method. The insulation coating identified by the above-described method is observed by the TEM (the bright field image). In the bright field image, a white region is a void. Whether or not the white region is the void can be clearly discriminated by the above-described TEM-EDS. On the observation field of view (the entire length $L_z$), a region which is the void and a region which is not the void in the insulation coating are binarized, and the void length $L_d$ in the direction orthogonal to the sheet thickness direction can be obtained by an image analysis.

Here, in the example of FIG. 5, the total $\Sigma L_d$ of the lengths $L_d$ of the voids 8 are $\Sigma L_d=L_1+L_2+L_3+L_4$. As shown in FIG. 5, when the voids 8 overlap in the sheet thickness direction, a value obtained by subtracting a length of an overlapping portion from a length of the overlapping voids $L_d$ is defined as the void length. In FIG. 5, a length of the two voids 8 which overlap when seen in the sheet thickness direction is $L_4$ which is obtained by subtracting the overlapping length.

The line segment ratio X is more preferably 10% or less from the viewpoint of improving the adhesion of the insulation coating. The lower limit of the line segment ratio X is not particularly limited and may be 0%.

In binarization of an image for performing the image analysis, the image may be binarized by manually coloring voids in a texture photograph based on the above-described void discrimination result.

The observation field of view may be the above-described central portion of the strain region. That is, the entire length $L_7$ of the observation field of view may be set to 10 μm.

For the line segment ratio X of the void, the line segment ratio of the void is measured at three points in the same strain region with an interval of 50 mm or more in the direction perpendicular to the rolling direction and the sheet thickness direction of the base steel sheet, and an arithmetic mean value of the line segment ratios is set as the line segment ratio X.

Figure 6:
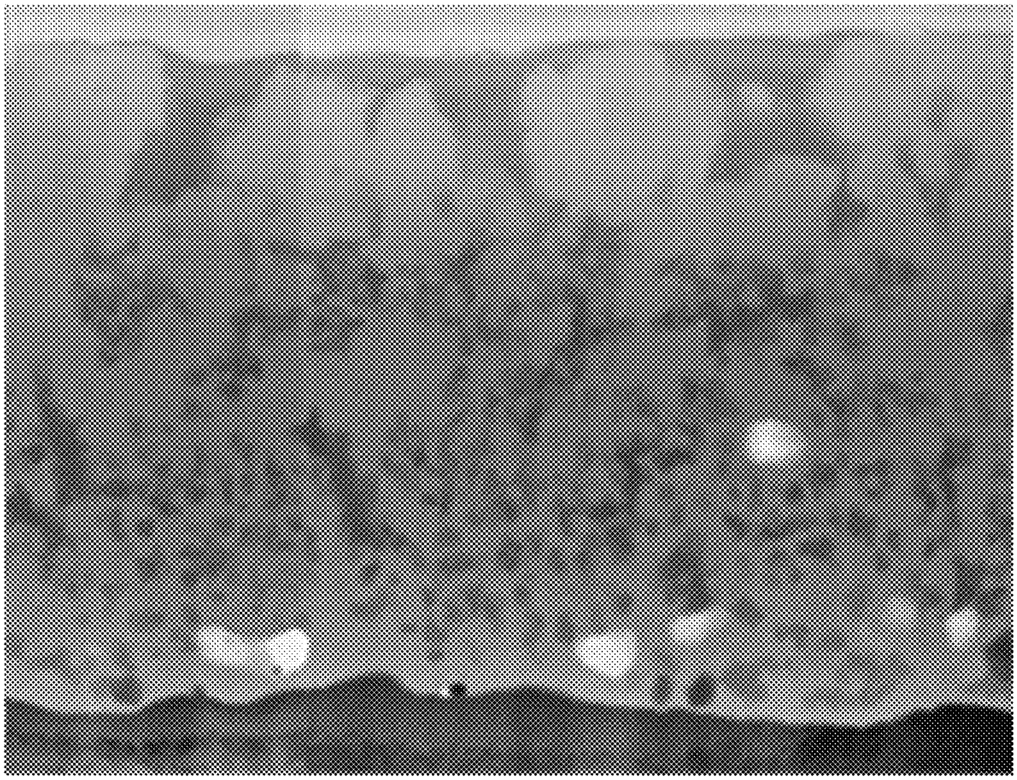
FIG. 6 is an example of a transmission electron microscope (TEM) image of a cross section of the grain-oriented electrical steel sheet according to the embodiment.

FIG. 6 shows an example of a TEM image of the cross section of the grain-oriented electrical steel sheet (the surface of the base steel sheet parallel to the rolling direction and the sheet thickness direction) which is taken with the central portion of the above-described strain region in view. In the image of FIG. 6, the void 8 in the insulation coating 3 is white, and a coarse black portion near the surface of the insulation coating 3 is the amorphous phosphorus oxide in the region 6. The crystalline phosphorus oxide region 5 and the amorphous phosphorus oxide region 6 can be seen on the base steel sheet 1 side of the insulation coating 3. The black portions represent the crystalline phosphorus oxide $M_2P_4O_{13}$ and the amorphous phosphorus oxide. Other than that, it is the matrix phase of the insulation coating 3.

In the grain-oriented electrical steel sheet according to the present embodiment, more preferably, the strain region D is continuously or discontinuously provided when seen in a direction perpendicular to the plate surface of the base steel sheet 1. The fact that the strain region D is continuously provided means that the strain region D is formed by 5 mm or more in the direction intersecting the rolling direction of the base steel sheet 1. The fact that the strain region D is discontinuously provided means that a point-shaped strain region D or an intermittent linear strain region D of 5 mm or less is formed in the direction intersecting the rolling direction of the base steel sheet 1.

With such a configuration, an effect in which the magnetic domain refinement effect can be stably obtained can be obtained.

In the grain-oriented electrical steel sheet according to the present embodiment, more preferably, a proportion of the crystalline phosphorus oxide region in the insulation coating of the central portion is 10% or more and 60% or less in terms of an area ratio in the cross-sectional view of the plane parallel to the rolling direction and the sheet thickness direction.

The area ratio is preferably 20% or more, and more preferably 30% or more. The area ratio is preferably 50% or less, and more preferably 40% or less. With such a configuration, the effect of improving the adhesion of the insulation coating can be obtained.

The area ratio of the crystalline phosphorus oxide region in the insulation coating of the central portion can be calculated by identifying the precipitate with the above-described method and then identifying the precipitate of the crystalline phosphorus oxide $M_2P_4O_{13}$ due to the analysis of the electron beam diffraction pattern. The area ratio of the crystalline phosphorus oxide region in the insulation coating of the central portion is a ratio of a total cross-sectional area of the crystalline phosphorus oxide region in the same cross section to the entire cross-sectional area of the insulation coating of the central portion including the precipitates or the voids. The cross-sectional areas may be calculated by image analysis or may be calculated from cross-sectional photographs.

In the grain-oriented electrical steel sheet according to the present embodiment, more preferably, the area ratio of the amorphous phosphorus oxide region in the insulation coating of the central portion is 1% or more and 60% or less in the cross-sectional view of the surface parallel to the rolling direction and the sheet thickness direction.

When the area ratio of the amorphous phosphorus oxide region is 1% or more, local stress in the insulation coating is relaxed. Further, when the area ratio of the amorphous phosphorus oxide region is 60% or less, an effect in which the tension of the insulation coating is not lowered can be obtained.

The area ratio of the amorphous phosphorus oxide region is more preferably 5% or more, and the area ratio of the amorphous phosphorus oxide region is more preferably 40% or less. The area ratio of the amorphous phosphorus oxide region in the insulation coating of the central portion can be measured by the same method as that in the area ratio of the crystalline phosphorus oxide region in the insulation coating of the central portion.

In the above-described cross-sectional view, as described above, the strain region D in the base steel sheet 1 of the grain-oriented electrical steel sheet according to the present embodiment can be discriminated by the confidential index (CI) value map of the electron backscatter diffraction (EBSD).

Regarding the grain-oriented electrical steel sheet according to the present embodiment, a component composition of the base steel sheet is not particularly limited. However, since the grain-oriented electrical steel sheet is manufactured through various processes, there are component compositions of material steel pieces (slabs) and base steel sheets which are preferable for manufacturing the grain-oriented electrical steel sheet according to the present embodiment. Such component compositions will be described below.

Hereinafter, % relating to the component composition of the material steel piece and the base steel sheet means mass % with respect to a total mass of the material steel piece or the base steel sheet.

(Component Composition of Base Steel Sheet)

The base steel sheet of the grain-oriented electrical steel sheet according to the present embodiment contains, for example, Si: 0.8 to 7.0%, and is limited to C: 0.005% or less, N: 0.005% or less, a total amounts of S and Se: 0.005% or less, and acid-soluble Al: 0.005% or less, and a remainder thereof is composed of Fe and impurities.

Si: 0.8% or more and 7.0% or less

Silicon (Si) increases electrical resistance of the grain-oriented electrical steel sheet and reduces the iron loss. The lower limit of the Si content is preferably 0.8% or more, and more preferably 2.0% or more. On the other hand, when the Si content exceeds 7.0%, the saturation magnetic flux density of the base steel sheet decreases, and thus it may be difficult to reduce a size of an iron core. Therefore, the upper limit of the Si content is preferably 7.0% or less.

C: 0.005% or less

Since carbon (C) forms a compound in the base steel sheet and deteriorates the iron loss, it is preferable to reduce an amount thereof. The C content is preferably limited to 0.005% or less. The upper limit of the C content is preferably 0.004% or less, and more preferably 0.003% or less. Since it is more preferable to reduce the amount of C, the lower limit includes 0%. However, when the amount of C is reduced to less than 0.0001%, the manufacturing cost will increase significantly. Thus, 0.0001% is a practical lower limit in manufacturing.

N: 0.005% or less

Since nitrogen (N) forms a compound in the base steel sheet and deteriorates the iron loss, it is preferable to reduce an amount thereof. The N content is preferably limited to 0.005% or less. The upper limit of the N content is preferably 0.004% or less, and more preferably 0.003% or less. Since it is more preferable to reduce the amount of N, the lower limit may be 0%.

Total amounts of S and Se: 0.005% or less

Since sulfur (S) and selenium (Se) form a compound in the base steel sheet and deteriorate the iron loss, it is preferable to reduce an amount thereof. The total of one or both of S and Se is preferably limited to 0.005% or less. The total amounts of S and Se is preferably 0.004% or less, and more preferably 0.003% or less. Since it is more preferable to reduce the amounts of S or Se, the lower limit may be 0%.

Acid-soluble Al: 0.005% or less

Since acid-soluble Al (acid-soluble aluminum) forms a compound in the base steel sheet and deteriorates the iron loss, it is preferable to reduce an amount thereof. The acid-soluble Al is preferably 0.005% or less. The acid-soluble Al is preferably 0.004% or less, and more preferably 0.003% or less. Since it is more preferable to reduce the amount of acid-soluble Al, the lower limit may be 0%.

The remainder in the component composition of the base steel sheet is composed of Fe and impurities. The "impurities" refer to those mixed in from ore, scrap, manufacturing environment, and the like as raw materials when steel is manufactured industrially.

Further, the base steel sheet of the grain-oriented electrical steel sheet according to the present embodiment may contain at least one selected from, for example, Mn (manganese), Bi (bismuth), B (boron), Ti (titanium), Nb (niobium), V (vanadium), Sn (tin), Sb (antimony), Cr (chromium), Cu (copper), P (phosphorus), Ni (nickel), and Mo (molybdenum) as a selective element in place of part of Fe which is the remainder in an extent in which characteristics thereof are not impaired.

An amount of the above-described selective element may be, for example, as follows. The lower limit of the selected element is not particularly limited, and the lower limit may be 0%. Further, even when the selective element is contained as impurities, the effect of the grain-oriented electrical steel sheet according to the present embodiment is not impaired.

Mn: 0% or more and 1.00% or less,
Bi: 0% or more and 0.010% or less,
B: 0% or more and 0.008% or less,
Ti: 0% or more and 0.015% or less,
Nb: 0% or more and 0.20% or less,
V: 0% or more and 0.15% or less,
Sn: 0% or more and 0.30% or less,
Sb: 0% or more and 0.30% or less,
Cr: 0% or more and 0.30% or less,
Cu: 0% or more and 0.40% or less,
P: 0% or more and 0.50% or less,
Ni: 0% or more and 1.00% or less, and
Mo: 0% or more and 0.10% or less.

The above-described chemical composition of the base steel sheet may be measured by a general analysis method. For example, a steel component may be measured using an inductively coupled plasma-atomic emission spectrum (ICP-AES). C and S may be measured using a combustion-infrared absorption method, N may be measured using an inert gas melting-thermal conductivity method, and O may be measured using an inert gas melting-non-dispersive infrared absorption method.

The base steel sheet of the grain-oriented electrical steel sheet according to the present embodiment preferably has a crystal grain texture developed in an {110} <001> orientation. The {110} <001> orientation means a crystal orientation (a Goss orientation) in which a {110} surface is aligned parallel to the surface of the steel sheet and an <100> axis is aligned in the rolling direction. In the grain-oriented electrical steel sheet, the magnetic properties are preferably improved by controlling the crystal orientation of the base steel sheet to the Goss orientation.

The texture of the silicon steel sheet described above may be measured by a general analysis method. For example, it may be measured by an X-ray diffraction method (a Laue method). The Laue method is a method in which a steel sheet is vertically irradiated with an X-ray beam and transmitted or reflected diffraction spots are analyzed. The crystal orientation of a place to which the X-ray beam is radiated can be identified by analyzing the diffraction spots. When the diffraction spots are analyzed at a plurality of locations by changing an irradiation position, the crystal orientation distribution at each of the irradiation positions can be measured. The Laue method is a method suitable for measuring the crystal orientation of a metal structure having coarse grains.

[Manufacturing Method of Grain-Oriented Electrical Steel Sheet]

Next, a method for manufacturing an electrical steel sheet according to the present invention will be described. A method for manufacturing a grain-oriented electrical steel sheet according to the present embodiment is not limited to the following method. The following manufacturing method is an example for manufacturing the grain-oriented electrical steel sheet according to the present embodiment.

The grain-oriented electrical steel sheet according to the present embodiment may be manufactured by forming the intermediate layer on the base steel sheet, from which the formation of the forsterite film is suppressed during the final annealing or the forsterite film is removed after the final annealing, as a starting material, forming the insulation coating and then forming the strain region.

The method for manufacturing a grain-oriented electrical steel sheet according to the present embodiment includes a strain region forming process of irradiating the grain-oriented electrical steel sheet having a base steel sheet, an intermediate layer disposed to be in contact with the base steel sheet, and an insulation coating disposed to be in contact with the intermediate layer with a laser beam or an electron beam and forming a strain region which extends in a direction intersecting a rolling direction on a surface of the base steel sheet.

In the strain region forming process of the method for manufacturing a grain-oriented electrical steel sheet according to the present embodiment, a temperature of a central portion of the strain region in the rolling direction and an extension direction of the strain region is heated to 900° C. or higher and 1500° C. or lower.

In the strain region forming process, a crystalline phosphorus oxide $M_2P_4O_{13}$ is stably formed by setting the temperature of the central portion of the strain region in the rolling direction and the extension direction of the strain region to 900° C. or higher. Further, when the temperature of the central portion of the strain region is 1500° C. or lower, the strain region can be formed without affecting the base steel sheet.

In the method for manufacturing a grain-oriented electrical steel sheet according to the present embodiment, (a) a base steel sheet from which a film of an inorganic mineral substance such as a forsterite generated during final-annealing is removed by pickling, grinding, or the like is annealed, or (b) a base steel sheet in which formation of the above-described film of the inorganic mineral substance is suppressed during final-annealing is annealed, (c) an intermediate layer is formed on a surface of the base steel sheet by the above-described annealing (a heat treatment in an atmosphere with a controlled dew point), and (d) an insulation coating forming solution mainly composed of a phosphate and colloidal silica is applied onto the intermediate layer and is baked.

In some cases, the annealing may not be performed after the final annealing, and the intermediate layer and the insulation coating may be formed at the same time by applying an insulation coating solution to the surface of the base steel sheet after the final annealing and then performing the annealing.

A grain-oriented electrical steel sheet having the base steel sheet, the intermediate layer disposed to be in contact with the base steel sheet, and the insulation coating disposed to be in contact with the intermediate layer as the outermost surface can be manufactured by the above-described manufacturing method.

The base steel sheet is produced, for example, as follows. A silicon steel piece containing 0.8 to 7.0 mass % of Si, preferably a silicon steel piece containing 2.0 to 7.0 mass % of Si is hot-rolled, the steel sheet after hot-rolling is annealed as necessary, and then the annealed steel sheet is cold-rolled once or twice or more with intermediate annealing interposed between them to finish the steel sheet with a final thickness. Next, in addition to decarburization, primary recrystallization is promoted by subjecting the steel sheet having the final thickness to decarburization annealing, and an oxide layer is formed on the surface of the steel sheet.

Next, an annealing separator containing magnesia as a main component is applied to the surface of the steel sheet having the oxide layer and is dried, and after the drying, the steel sheet is coiled in a coil shape. Then, the coiled steel sheet is subjected to final annealing (secondary recrystallization). A forsterite film mainly composed of a forsterite ($Mg_2SiO_4$) is formed on the surface of the steel sheet during final annealing. This forsterite film is removed by pickling, grinding, or the like. After the removal, the surface of the steel sheet is preferably smoothed by chemical polishing or electrolytic polishing.

On the other hand, as the above-described annealing separator, an annealing separator containing alumina instead of magnesia as a main component can be used. The annealing separator containing alumina as a main component is applied to the surface of the steel sheet having an oxide layer and is dried, and after the drying, the steel sheet is coiled in a coil shape. Then, the coiled steel sheet is subjected to final annealing (the secondary recrystallization). When the annealing separator containing alumina as a main component is used, even when final annealing is performed, the formation of the film of the inorganic mineral substance such as a forsterite on the surface of the steel sheet is suppressed. After final-annealing, the surface of the steel sheet is preferably smoothed by chemical polishing or electrolytic polishing.

The base steel sheet from which the film of inorganic minerals such as a forsterite is removed, or the base steel sheet in which the formation of the film of the inorganic mineral substance such as a forsterite is suppressed is annealed in an atmospheric gas having a controlled dew point to form the intermediate layer mainly composed of a silicon oxide on the surface of the base steel sheet. In some cases, the annealing may not be performed after the final annealing, and the insulation coating may be formed on the surface of the base steel sheet after the final annealing.

The annealing atmosphere is preferably a reducing atmosphere so that the inside of the steel sheet is not oxidized, and particularly preferably a nitrogen atmosphere mixed with hydrogen. For example, an atmosphere in which hydrogen:nitrogen is 80 to 20%:20 to 80% (100% in total) and the dew point is −20 to 2° C. is preferable.

The thickness of the intermediate layer is controlled by appropriately adjusting an annealing temperature, a holding time, and one or more dew points of the annealing atmosphere. The thickness of the intermediate layer is preferably 2 to 400 nm on average from the viewpoint of ensuring the coating adhesion of the insulation coating. More preferably, it is 5 to 300 nm.

Next, a solution for forming the insulation coating mainly composed of a phosphate and colloidal silica is applied onto the intermediate layer and is baked, and the grain-oriented electrical steel sheet having the base steel sheet, the intermediate layer disposed to be in contact with the base steel sheet, and the insulation coating disposed to be in contact with the intermediate layer is obtained. In this case, the insulation coating may form the outermost surface of the grain-oriented electrical steel sheet.

Next, the grain-oriented electrical steel sheet obtained in the above-described processes is irradiated with a laser beam or an electron beam to form the strain region which extends in a direction intersecting the rolling direction on the surface of the base steel sheet.

In the strain region forming process, a laser beam or an electron beam is radiated so that the temperature of the central portion of the strain region in the rolling direction and the extension direction of the strain region is heated to 900° C. or higher and 1500° C. or lower. The temperature of the central portion of the strain region is more preferably 1100° C. or higher, and the temperature of the central portion of the strain region is more preferably 1420° C. or lower.

As described above, in the present embodiment, stress strain portions (the strain regions) which extend in the direction intersecting the rolling direction are formed at predetermined intervals in the rolling direction by irradiating the grain-oriented electrical steel sheet with a laser beam or an electron beam. The central portion of the strain region in the rolling direction is a region including the center of the strain region described above. When a laser beam or an electron beam is radiated discontinuously, for example, in a dot shape in the direction intersecting the rolling direction, the central portion of the strain region in the extension direction in the strain region extends is a region including a midpoint (that is, a center) of a line segment connecting the end portions in the extension direction of the strain region in the continuous strain region in each of dot-shaped irradiation portions, and means a region having a width of 10 μm in the extension direction of the strain region from the midpoint (the center). When a laser beam or an electron beam is radiated continuously (that is, continuously from one end portion to the other end portion of the grain-oriented electrical steel sheet in a width direction), since the same strain is formed at all positions, all portions are analyzed as the central portion of the strain region (the central portion of the strain region in the extension direction of the strain region). In this way, the region corresponding to both the central portion of the strain region in the rolling direction and the central portion of the strain region in the extension direction of the strain region is heated to 900° C. or higher and 1500° C. or lower.

Regarding the radiation conditions of the laser beam in the strain region forming process, preferably, a laser radiation energy density per unit area is 0.8 to 6.5 $mJ/mm^2$. The laser radiation energy density per unit area is more preferably 1.0 $mJ/mm^2$ or more, and more preferably 4.0 $mJ/mm^2$ or less.

A beam radiation width is preferably 10 to 500 μm. The beam radiation width is more preferably 20 μm or more, and more preferably 100 μm or less.

A radiation interval of the laser beam in the strain region forming process is preferably 1 mm to 20 mm. The radiation interval of the laser beam is more preferably 2 mm or more, and more preferably 10 mm or less.

A radiation time of the laser beam in the strain region forming process is preferably 5 to 200 μs.

A line segment ratio X of the void, a distribution of the crystalline phosphorus oxide of $M_2P_4O_{13}$ (the presence or absence of $M_2P_4O_{13}$, an area ratio, and the like) in the insulation coating in the central portion of the strain region, an average thickness of the intermediate layer in the central portion of the strain region, and the like can be adjusted by adjusting the laser radiation conditions. The laser radiation conditions affect each other in a complicated manner, and thus it cannot be said in a word, but for example, the line segment ratio X of the void can be adjusted by the temperature of the central portion of the strain region in the rolling direction and the extension direction of the strain region. As the temperature becomes higher, the line segment ratio X of the void tends to be larger. However, the line segment ratio X may be affected by the laser radiation energy density per unit area, the beam radiation width, and the like. Further, the presence or absence of the crystalline phosphorus oxide $M_2P_4O_{13}$ in the insulation coating of the central portion of the strain region can be adjusted by the beam radiation width or the like. The area ratio of the crystalline phosphorus oxide $M_2P_4O_{13}$ can be adjusted by the temperature of the central portion of the strain region in the rolling direction and the extension direction of the strain region in addition to the beam radiation width. The average thickness of the intermediate layer at the central portion of the strain region can be adjusted by the temperature of the central portion of the strain region in the rolling direction and the extension direction of the strain region. As the temperature of the central portion of the strain region in the rolling direction and the extension direction of the strain region becomes higher, the average thickness of the intermediate layer at the central portion of the strain region tends to be thicker. However, it tends to become thinner with generation of the voids.

Each of the layers of the grain-oriented electrical steel sheet according to the present embodiment is observed and measured as follows.

A test piece is cut out from the grain-oriented electrical steel sheet, and a coating structure of the test piece is observed with a scanning electron microscope or a transmission electron microscope.

Specifically, first, the test piece is cut out so that a cutting direction is parallel to the sheet thickness direction (in detail, the test piece is cut out so that a cut surface is parallel to the sheet thickness direction and perpendicular to the rolling direction), and a cross-sectional structure of the cut surface is observed by the SEM at a magnification at which each of the layers is included in the observation field of view. It is possible to infer how many layers the cross-sectional structure includes by observing with a backscattered electron composition image (the COMPO image).

In order to identify each of the layers in the cross-sectional structure, a line analysis in the sheet thickness direction is performed, and a quantitative analysis of the chemical composition of each of the layers is performed using an energy dispersive X-ray spectroscopy (SEM-EDS).

The elements to be quantitatively analyzed are five elements, Fe, Cr, P, Si, and O. The "atomic %" described below is not an absolute value of atomic %, but a relative value calculated based on the X-ray intensity corresponding to the five elements. In the following, specific numerical values when the relative values are calculated using the above-described device or the like are shown.

First, the base steel sheet, the intermediate layer, and the insulation coating are identified as follows based on the observation results of the COMPO image and the quantitative analysis results of the SEM-EDS. That is, when it is assumed that there is a region in which the Fe content is 80 atomic % or more and an O content is less than 30 atomic % excluding the measurement noise, and a line segment (a thickness) on the scanning line of the line analysis corresponding to this region is 300 nm or more, this region is determined as the base steel sheet, and the regions excluding the base steel sheet are determined as the intermediate layer and the insulation coating.

As a result of observing the region excluding the base steel sheet identified above, when there is a region in which a P content is 5 atomic % or more and the O content is 30 atomic % or more excluding the measurement noise, and also the line segment (the thickness) on the scanning line of the line analysis corresponding to this region is 300 nm or more, this region is determined as the insulation coating.

When the region that is the above-described insulation coating is identified, precipitates or inclusions contained in the film are not included in targets for determination, and the region which satisfies the above quantitative analysis result as the matrix phase is determined to be the insulation coating. For example, when it is confirmed from the COMPO image or the line analysis result that precipitates or inclusions are present on the scanning line of the line analysis, determination is made based on the quantitative analysis results as the matrix phase without this region being included in the targets. The precipitates or inclusions can be distinguished from the matrix phase by a contrast in the COMPO image, and can be distinguished from the matrix phase by an amount of constituent elements present in the quantitative analysis results.

When there is the region excluding the base steel sheet and the insulation coating identified above, and the line segment (the thickness) on the scanning line of the line analysis corresponding to this region is 300 nm or more, this region is determined as the intermediate layer. The intermediate layer may satisfy an average Si content of 20 atomic % or more and an average O content of 30 atomic % or more as an overall average (for example, the arithmetic mean of the atomic % of each of the elements measured at each of measurement points on the scanning line). The quantitative analysis results of the intermediate layer are quantitative analysis results as the matrix phase, which do not include analysis results of the precipitates or inclusions contained in the intermediate layer.

Further, in the region determined as the insulation coating above, a region in which the total amounts of Fe, Cr, P and O is 70 atomic % or more and the Si content is less than 10 atomic % excluding the measurement noise is determined as the precipitate.

As described above, the crystal structure of the above-described precipitate can be identified from a pattern of electron beam diffraction.

Although $M_2P_2O_7$ may be present in the conventional insulation coating, the crystal structure of $M_2P_2O_7$ (M is at least one or both of Fe and Cr) can be identified and discriminated from the pattern of the electron beam diffraction.

The identification of each of the layers and the measurement of the thickness by the above-described COMPO image observation and SEM-EDS quantitative analysis are performed at five or more locations with different observation fields of view. An arithmetic mean value is obtained from values excluding a maximum value and a minimum value among the thicknesses of the layers obtained at five or more locations in total, and this average value is used as the thickness of each of the layers. However, preferably, the thickness of the oxide film which is the intermediate layer is measured at a location at which it can be determined that it is an external oxidation region and not an internal oxidation region by the observation of its morphology, and an average value thereof is obtained.

When there is a layer in which the line segment (the thickness) on the scanning line of the line analysis is less than 300 nm in at least one of the above-described five or more observation fields of view, a corresponding layer is observed in detail with the TEM, and the identification of the corresponding layer and the measurement of the thickness are performed by the TEM.

More specifically, a test piece including a layer to be observed in detail using the TEM is cut out by focused ion beam (FIB) processing so that a cutting direction is parallel to the sheet thickness direction (specifically, the test piece is cut out so that a cut surface is parallel to the sheet thickness direction and perpendicular to the rolling direction), and the cross-sectional structure of this cut surface (a bright field image) is observed by scanning-TEM (STEM) at a magnification at which the corresponding layer is included in the observation field of view. When each of the layers is not included in the observation field of view, the cross-sectional structure is observed in a plurality of continuous fields of view.

In order to identify each of the layers in the cross-sectional structure, the line analysis is performed in the sheet thickness direction using the TEM-EDS, and the quantitative analysis of the chemical composition of each of the layers is performed. The elements to be quantitatively analyzed are five elements, Fe, Cr, P, Si, and O.

Each of the layers is identified and the thickness of each of the layers is measured based on the bright field image observation results by the TEM and the quantitative analysis results of the TEM-EDS described above. The method for identifying each of the layers and the method for measuring the thickness of each of the layers using the TEM may be performed according to the above-described method using the SEM.

Specifically, the region in which the Fe content is 80 atomic % or more and the O content is less than 30 atomic % excluding the measurement noise is determined as the base steel sheet, and the regions excluding the base steel sheet are determined as the intermediate layer and the insulation coating.

In the region excluding the base steel sheet identified above, the region in which the P content is 5 atomic % or more and the O content is 30 atomic % or more excluding the measurement noise is determined as the insulation coating. When the above-described region which is the insulation coating is determined, the precipitates or inclusions contained in the insulation coating are not included in targets for determination, and the region which satisfies the above quantitative analysis result as the matrix phase is determined as the insulation coating.

The region excluding the base steel sheet and the insulation coating identified above is determined as the intermediate layer. The intermediate layer may satisfy an average Si content of 20 atomic % or more and an average 0 content of 30 atomic % or more as an average of the entire intermediate layer. The above-described quantitative analysis results of the intermediate layer do not include the analysis results of the precipitates or inclusions contained in the intermediate layer and are the quantitative analysis results as the matrix phase.

Further, in the region determined as the insulation coating above, a region in which the total amounts of Fe, Cr, P and O is 70 atomic % or more and the Si content is less than 10 atomic % excluding the measurement noise is determined as the precipitate. As described above, a crystal structure of the precipitate can be identified from the pattern of electron beam diffraction.

For the intermediate layer and the insulation coating identified above, the line segment (the thickness) is measured on the scanning line of the above-described line analysis. When the thickness of each of the layers is 5 nm or less, it is preferable to use a TEM having a spherical aberration correction function from the viewpoint of spatial resolution. Further, when the thickness of each of the layers is 5 nm or less, a point analysis may be performed in the sheet thickness direction at intervals of, for example, 2 nm, the line segment (the thickness) of each of the layers may be measured, and this line segment may be adopted as the thickness of each of the layers. For example, when the TEM having the spherical aberration correction function is used, an EDS analysis can be performed with a spatial resolution of about 0.2 nm.

The observation and measurement with the TEM was carried out at five or more locations with different observation fields of view, and an arithmetic mean value is calculated from values obtained by excluding the maximum and minimum values from the measurement results obtained at five or more locations in total, and the average value is adopted as the average thickness of the corresponding layer.

In the grain-oriented electrical steel sheet according to the above-described embodiment, since the intermediate layer is present to be in contact with the base steel sheet and the insulation coating is present to be in contact with the intermediate layer, when each of the layers is identified by the above-described determination standards, there is no layer other than the base steel sheet, the intermediate layer, and the insulation coating. However, the above-described crystalline phosphorus oxide $M_2P_4O_{13}$ region or amorphous phosphorus oxide region may be present in a layer shape.

Further, the above-described amounts of Fe, P, Si, O, Cr, and the like contained in the base steel sheet, the intermediate layer, and the insulation coating are the determination standards for identifying the base steel sheet, the intermediate layer, and the insulation coating and obtaining the thickness thereof.

When the coating adhesion of the insulation coating of the grain-oriented electrical steel sheet according to the above-described embodiment is measured, it can be evaluated by performing a bending adhesion test. Specifically, a flat sheet-shaped test piece of 80 mm×80 mm is wound around a round bar having a diameter of 20 mm and is then stretched flat. Then, an area of the insulation coating which is not peeled off from the electrical steel sheet is measured, and a value obtained by dividing the area which is not peeled off by an area of the steel sheet is defined as a coating residual area ratio (%) to evaluate the coating adhesion of the insulation coating. For example, it may be calculated by placing a transparent film with a 1 mm grid scale on the test piece and measuring the area of the insulation coating which is not peeled off.

The iron loss ($W_{17150}$) of the grain-oriented electrical steel sheet is measured under conditions of an AC frequency of 50 Hz and an induced magnetic flux density of 1.7 T.

EXAMPLES

Next, although the effect of one aspect of the present invention will be described in more detail by examples, the conditions in the examples are one condition example adopted for confirming feasibility and effect of the present invention, and the present invention is not limited to this one condition example.

In the present invention, various conditions can be adopted as long as the gist of the present invention is not deviated and the object of the present invention is achieved.

The material steel pieces having the component composition shown in Table 1 were soaked at 1150° C. for 60 minutes and then subjected to hot rolling to obtain a hot-rolled steel sheet having a thickness of 2.3 mm. Next, the hot-rolled steel sheet was subjected to hot-band annealing in which it is held at 1120° C. for 200 seconds, immediately cooled, held at 900° C. for 120 seconds, and then rapidly cooled. The hot-band annealed steel sheet was pickled and then subjected to cold rolling to obtain a cold-rolled steel sheet having a final sheet thickness of 0.23 mm.

TABLE 1

| Material | Component composition (mass %) | | | | | |
|---|---|---|---|---|---|---|
| Steel piece | Si | C | Al | Mn | S | N |
| A | 3.25 | 0.052 | 0.029 | 0.110 | 0.007 | 0.008 |

This cold-rolled steel sheet (hereinafter, referred to as a "steel sheet") was subjected to decarburization annealing in which it is held in an atmosphere of hydrogen:nitrogen of 75%:25% at 850° C. for 180 seconds. The steel sheet after the decarburization annealing was subjected to nitriding annealing in which it is held in a mixed atmosphere of hydrogen, nitrogen and ammonia at 750° C. for 30 seconds to adjust a nitrogen content of the steel sheet to 230 ppm.

An annealing separator containing alumina as a main component is applied to the steel sheet after the nitriding annealing, and then the steel sheet is heated to 1200° C. at a heating rate of 15° C./hour in a mixed atmosphere of hydrogen and nitrogen for final annealing. Then, the steel sheet was subjected to purification annealing in which it is held at 1200° C. for 20 hours in a hydrogen atmosphere. Then, the steel sheet was naturally cooled to prepare a base steel sheet having a smooth surface.

The prepared base steel sheet was annealed under conditions of 25% $N_2$+75% $H_2$, dew point: −2° C. atmosphere, 950° C., and 240 seconds, and an intermediate layer having an average thickness of 9 nm was formed on the surface of the base steel sheet.

An insulation coating was formed by applying a solution mainly composed of a phosphate and colloidal silica on the surface of the base steel sheet on which the intermediate layer was formed and then performing baking.

Next, a strain region was formed under various conditions shown in Table 2. In Table 2, "temperature of central portion of strain region" means a temperature of the central portion of the strain region in the rolling direction of the base steel sheet and the extension direction of the strain region. "Beam radiation width" means a beam width in the rolling direction of the base steel sheet.

TABLE 2

| | Formation of strain region | | | | |
|---|---|---|---|---|---|
| | Temperature of central portion of strain region (° C.) | Power density (mJ/mm²) | Radiation time (μs) | Beam radiation width (μm) | Radiation interval (mm) |
| Example 1 | 1140 | 2.8 | 45 | 100 | 4 |
| Example 2 | 1210 | 3.3 | 45 | 100 | 4 |
| Example 3 | 1410 | 6.5 | 45 | 100 | 3 |

TABLE 2-continued

| | Formation of strain region | | | | |
|---|---|---|---|---|---|
| | Temperature of central portion of strain region (° C.) | Power density (mJ/mm²) | Radiation time (μs) | Beam radiation width (μm) | Radiation interval (mm) |
| Example 4 | 900 | 2.2 | 12 | 50 | 1 |
| Example 5 | 1020 | 2.2 | 23 | 50 | 2 |
| Example 6 | 1140 | 2.2 | 34 | 50 | 3 |
| Example 7 | 1260 | 2.2 | 45 | 50 | 4 |
| Example 8 | 1380 | 2.2 | 56 | 50 | 5 |
| Example 9 | 1500 | 2.2 | 67 | 50 | 6 |
| Example 10 | 960 | 1.1 | 17 | 50 | 3 |
| Example 11 | 1320 | 3.3 | 17 | 50 | 3 |
| Example 12 | 1410 | 3.9 | 17 | 50 | 3 |
| Example 13 | 1380 | 3.7 | 186 | 50 | 3 |
| Example 14 | 1320 | 3.3 | 6 | 50 | 3 |
| Example 15 | 1480 | 2.2 | 42 | 20 | 2 |
| Example 16 | 910 | 4.5 | 63 | 500 | 5 |
| Example 17 | 1430 | 1.7 | 17 | 100 | 12 |
| Comparative example 1 | 830 | 0.4 | 45 | 100 | 4 |
| Comparative example 2 | 870 | 0.7 | 45 | 100 | 4 |
| Comparative example 3 | 1640 | 8.9 | 45 | 100 | 3 |
| Comparative example 4 | 1830 | 6.7 | 28 | 50 | 3 |

Based on the above-described observation and measurement method, a test piece was cut out from a grain-oriented electrical steel sheet on which an insulation coating is formed, the coating structure of the test piece was observed with a scanning electron microscope (SEM) or a transmission electron microscope (TEM), the central portion of the strain region was identified, and the thickness of the intermediate layer and the thickness of the insulation coating were measured. In addition, the precipitate was identified. The specific method is as described above.

Table 3 shows the results of the presence or absence of the crystalline phosphorus oxide $M_2P_4O_{13}$ in the insulation coating on the strain region. The "thickness ratio of intermediate layer in central portion of strain region" in Table 3 means a ratio of the average thickness of the intermediate layer in the central portion of the strain region to an average of the intermediate layers other than the strain region. As can be seen from Table 3, in the grain-oriented electrical steel sheet produced by the manufacturing method of the present embodiment, the crystalline phosphorus oxide $M_2P_4O_{13}$ is present in the insulation coating on the strain region. On the other hand, in Comparative examples 1 and 2, the crystalline phosphorus oxide $M_2P_4O_{13}$ was not present in the insulation coating. Moreover, the area ratio of the precipitate, the line segment ratio X of the void region, and the thickness ratio of the intermediate layer were all measured and found to be 0. In Comparative examples 3 and 4, the surface of the base material in the central portion of the strain region was melted and the insulation coating was peeled off after the laser beam radiation, and the presence of the crystalline phosphorus oxide $M_2P_4O_{13}$ could not be confirmed. In addition, the area ratio of the precipitate, the line segment ratio X of the void region, and the thickness ratio of the intermediate layer could not be measured.

TABLE 3

| | Presence or absence of phosphorus oxide ($M_2P_4O_{13}$) | Area ratio of precipitate (%) — $M_2P_4O_{13}$ in central portion of strain region | Area ratio of precipitate (%) — Amorphous phosphorus oxide in central portion of strain region | Line segment ratio of void region (%) — Line segment ratio X of void in central portion of strain region | Thickness ratio of intermediate layer — Thickness ratio of intermediate layer in central portion of strain region |
|---|---|---|---|---|---|
| Example 1 | Presence | 54 | 6 | 5 | 1.3 |
| Example 2 | Presence | 24 | 28 | 12 | 1.3 |
| Example 3 | Presence | 6 | 51 | 21 | 0.8 |
| Example 4 | Presence | 11 | 0 | 1 | 1.1 |
| Example 5 | Presence | 28 | 2 | 6 | 1.4 |
| Example 6 | Presence | 57 | 5 | 11 | 1.0 |
| Example 7 | Presence | 21 | 31 | 16 | 1.3 |
| Example 8 | Presence | 13 | 45 | 20 | 1.1 |
| Example 9 | Presence | 5 | 58 | 19 | 0.9 |
| Example 10 | Presence | 22 | 0 | 4 | 1.3 |
| Example 11 | Presence | 16 | 53 | 15 | 1.1 |
| Example 12 | Presence | 11 | 64 | 18 | 0.9 |
| Example 13 | Presence | 9 | 60 | 20 | 1.7 |
| Example 14 | Presence | 11 | 53 | 18 | 1.2 |
| Example 15 | Presence | 4 | 58 | 20 | 1.1 |
| Example 16 | Presence | 13 | 0 | 1 | 1.3 |
| Example 17 | Presence | 8 | 53 | 18 | 1.1 |
| Comparative example 1 | Absence | 0 | 0 | 0 | 1.2 |
| Comparative example 2 | Absence | 0 | 0 | 0 | 1.2 |
| Comparative example 3 | — | — | — | — | 0.2 |
| Comparative example 4 | — | — | — | — | 0.3 |

Next, a test piece of 80 mm×80 mm was cut out from the grain-oriented electrical steel sheet on which the insulation coating was formed, wound around a round bar having a diameter of 20 mm, and then stretched flat. Then, the area of the insulation coating which is not peeled from the electrical steel sheet was measured, and the coating residual area ratio (%) was calculated. The results are shown in Table 4.

TABLE 4

| | Adhesion | Iron loss $W_{17}/W_{50}$(W/kg) |
|---|---|---|
| Example 1 | ⊚ | 0.64 |
| Example 2 | ⊚ | 0.64 |
| Example 3 | ○ | 0.68 |
| Example 4 | ⊚ | 0.67 |
| Example 5 | ○ | 0.64 |
| Example 6 | ⊚ | 0.64 |
| Example 7 | ⊚ | 0.64 |
| Example 8 | ⊚ | 0.66 |
| Example 9 | ○ | 0.67 |
| Example 10 | ○ | 0.69 |
| Example 11 | ⊚ | 0.63 |
| Example 12 | ⊚ | 0.64 |
| Example 13 | ⊚ | 0.66 |
| Example 14 | ⊚ | 0.65 |
| Example 15 | ⊚ | 0.64 |
| Example 16 | ○ | 0.68 |
| Example 17 | ⊚ | 0.67 |
| Comparative example 1 | ⊚ | 0.77 |
| Comparative example 2 | ⊚ | 0.71 |
| Comparative example 3 | X | 0.75 |
| Comparative example 4 | X | 0.72 |

The adhesion of the insulation coating was evaluated on a three stages. "⊚ (Excellent)" means that the coating residual area ratio is 95% or more. "○ (Good)" means that the coating residual area ratio is 90% or more. "× (Poor)" means that the coating residual area ratio is less than 90%.

In Comparative examples 3 and 4, the surface of the base steel sheet was melted and the coating was peeled off.

In addition, the iron loss of the grain-oriented electrical steel sheet of each of the experimental examples was measured. The results are shown in Table 4.

As can be seen from Table 4, in the grain-oriented electrical steel sheet produced by the manufacturing method of the present invention, the iron loss was reduced.

INDUSTRIAL APPLICABILITY

According to the present invention, it is possible to provide a grain-oriented electrical steel sheet capable of ensuring good adhesion of an insulation coating and obtaining a good iron loss reduction effect in grain-oriented electrical steel sheets which do not have a forsterite film and have strain regions formed on the base steel sheet, and a method for manufacturing such a grain-oriented electrical steel sheet. Therefore, it has high industrial applicability.

BRIEF DESCRIPTION OF THE REFERENCE SYMBOLS

1 Base steel sheet
2 Forsterite film
3 Insulation coating
4 Intermediate layer
5 Region containing precipitate of crystalline phosphorus oxide $M_2P_4O_{13}$
6 Region containing precipitate of amorphous phosphorus oxide
7 Matrix phase of insulation coating
8 Void

The invention claimed is:

1. A grain-oriented electrical steel sheet having a base steel sheet, an intermediate layer disposed to be in contact with the base steel sheet, and an insulation coating disposed to be in contact with the intermediate layer, the grain-oriented electrical steel sheet comprising:

a surface of the base steel sheet having a strain region which extends in a direction intersecting a rolling direction of the base steel sheet, and a crystalline phosphorus oxide $M_2P_4O_{13}$ present in the insulation coating on the strain region in a cross-sectional view of a surface parallel to the rolling direction and a sheet thickness direction of the base steel sheet (M means at least one or both of Fe and Cr).

2. The grain-oriented electrical steel sheet according to claim 1, wherein, in the cross-sectional view of the strain region, when an entire length of an observation field of view in a direction orthogonal to the sheet thickness direction of the base steel sheet is defined as $L_z$, and a total of void lengths Ld in the direction orthogonal to the sheet thickness direction of the base metal sheet is ΣLd, and a line segment ratio X of a void region in which the voids are present is defined by the following Equation 1, the line segment ratio X is 20% or less.

$$X=(\Sigma L_d/L_z)\times 100 \quad \text{(Equation 1)}$$

3. The grain-oriented electrical steel sheet according to claim 1, wherein, in the cross-sectional view of the surface parallel to the rolling direction and the sheet thickness direction of the base steel sheet, when a region including a center of the strain region in the rolling direction of the base steel sheet and having a width of 10 μm in the rolling direction of the base steel sheet is defined as a central portion of the strain region, the crystalline phosphorus oxide $M_2P_4O_{13}$ is present in the insulation coating of the central portion.

4. The grain-oriented electrical steel sheet according to claim 3, wherein, in the cross-sectional view of the strain region, a proportion of a crystalline phosphorus oxide region in the insulation coating of the central portion is 10% or more and 60% or less in terms of an area ratio.

5. The grain-oriented electrical steel sheet according to claim 3 4, wherein, in the cross-sectional view of the strain region, an average thickness of the intermediate layer of the central portion is 0.5 times or more and twice or less an average thickness of the intermediate layer other than the strain region.

6. The grain-oriented electrical steel sheet according to claim 3, wherein, in the cross-sectional view of the strain region, an area ratio of an amorphous phosphorus oxide region in the insulation coating of the central portion is 1% or more and 60% or less.

7. A method for manufacturing the grain-oriented electrical steel sheet according to claim 1, the method comprising:

a strain region forming process of irradiating the grain-oriented electrical steel sheet having the base steel sheet, the intermediate layer disposed to be in contact with the base steel sheet, and the insulation coating disposed to be in contact with the intermediate layer with a laser beam or an electron beam and forming a strain region which extends in the direction intersecting the rolling direction on the surface of the base steel sheet, wherein, in the strain region forming process, a temperature of the central portion of the strain region in the rolling direction of the base steel sheet and an extension direction of the strain region is heated to 900° C. or higher and 1500° C. or lower.

8. The method according to claim 7, wherein, in the strain region forming process, the strain region is formed by irradiating the grain-oriented electrical steel sheet with the laser beam, and radiation conditions of the laser beam are, laser radiation energy density per unit area: 0.8 to 6.5 $mJ/mm^2$ beam radiation width: 10 to 500 μm radiation interval: 1 to 20 mm radiation time: 5 to 200 μs.

* * * * *